(12) United States Patent
Dubuc et al.

(10) Patent No.: US 7,388,847 B2
(45) Date of Patent: Jun. 17, 2008

(54) CHANNEL QUALITY INDICATOR FOR OFDM

(75) Inventors: Christian Dubuc, Aylmer (CA); Jason Robert Duggan, Nepean (CA); Peiying Zhu, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 823 days.

(21) Appl. No.: 10/678,631

(22) Filed: Oct. 3, 2003

(65) Prior Publication Data

US 2005/0041622 A1    Feb. 24, 2005

Related U.S. Application Data

(60) Provisional application No. 60/495,944, filed on Aug. 18, 2003.

(51) Int. Cl.
*H04Q 7/00* (2006.01)
(52) U.S. Cl. ............... 370/329; 370/344; 455/452.2
(58) Field of Classification Search ................ 370/208, 370/203, 329, 465, 485, 344; 450/450–451, 450/452.1, 452.2, 69
See application file for complete search history.

(56) References Cited

U.S. PATENT DOCUMENTS

| | | | | |
|---|---|---|---|---|
| 7,039,001 | B2* | 5/2006 | Krishnan et al. | 370/203 |
| 7,126,996 | B2* | 10/2006 | Classon et al. | 375/260 |
| 2003/0072395 | A1* | 4/2003 | Jia et al. | 375/341 |
| 2005/0031028 | A1* | 2/2005 | Chiu | 375/224 |

* cited by examiner

*Primary Examiner*—Nguyen Vo
(74) *Attorney, Agent, or Firm*—Withrow & Terranova, PLLC (57) ABSTRACT

The present invention provides an improved channel quality indicator indicia for OFDM communication environments. In addition to taking into consideration carrier-to-interference ratios, the present invention also takes into consideration the degree to which the channel response varies among the sub-carriers throughout the OFDM frequency band. The carrier-to-interference ratio and the degree of channel response variation are directly or indirectly used by a base station to select coding and modulation schemes for transmissions from the base station to the mobile terminal reporting these factors. Further, scheduling of data sent to the mobile terminal and other mobile terminals competing for the same channel resources may also be based in part on the carrier-to-interference ratio and the degree to which the channel response varies.

47 Claims, 8 Drawing Sheets

CHANNEL QUALITY INDICATOR FOR OFDM

This application claims the benefit of U.S. provisional patent application Ser. No. 60/495,944, filed Aug. 18, 2003, the disclosure of which is hereby incorporated by reference in its entirety.

FIELD OF THE INVENTION

The present invention relates to communications, and in particular to providing an improved channel quality indicator for an orthogonal frequency division multiplexing communication environment.

BACKGROUND OF THE INVENTION

Today's advanced wireless packet data CDMA systems, such as High Speed Data Packet Access (HSDPA) systems, measure the carrier-to-interference ratio (CIR) at a mobile terminal, and based on this measurement, send channel quality indicator (CQI) information to the base station. The CQI information, as defined using the CIR measurement for CDMA systems, is a reliable indication of the error rate expected at the mobile terminal. CQI information is continuously reported back to the base station because the transmission channel conditions change as the mobile terminal and objects around the mobile terminal move. Therefore, the CQI information reporting occurs on a regular basis, continuously updating the base station of the changing channel conditions experienced by the mobile terminal. The base station receives CQI information for each active mobile terminal that is attempting to share a common transmission channel.

The base station uses the CQI information for two primary purposes. The first purpose is to select from various levels of modulation and coding to use for transmissions to the mobile terminal in an effort to maximize the throughput to that particular mobile terminal or for the system in general. The second purpose is to assist in scheduling when and how much information should be sent to the mobile terminal and other mobile terminals competing for channel resources. Depending on the scheduling criteria, the base station may choose to send more data to those mobile terminals experiencing good channel conditions to maximize the system's overall throughput. For example, the scheduling criteria may dictate sending information only to those mobile terminals having channel conditions sufficient to support the highest data rate or rates.

Figure 1:
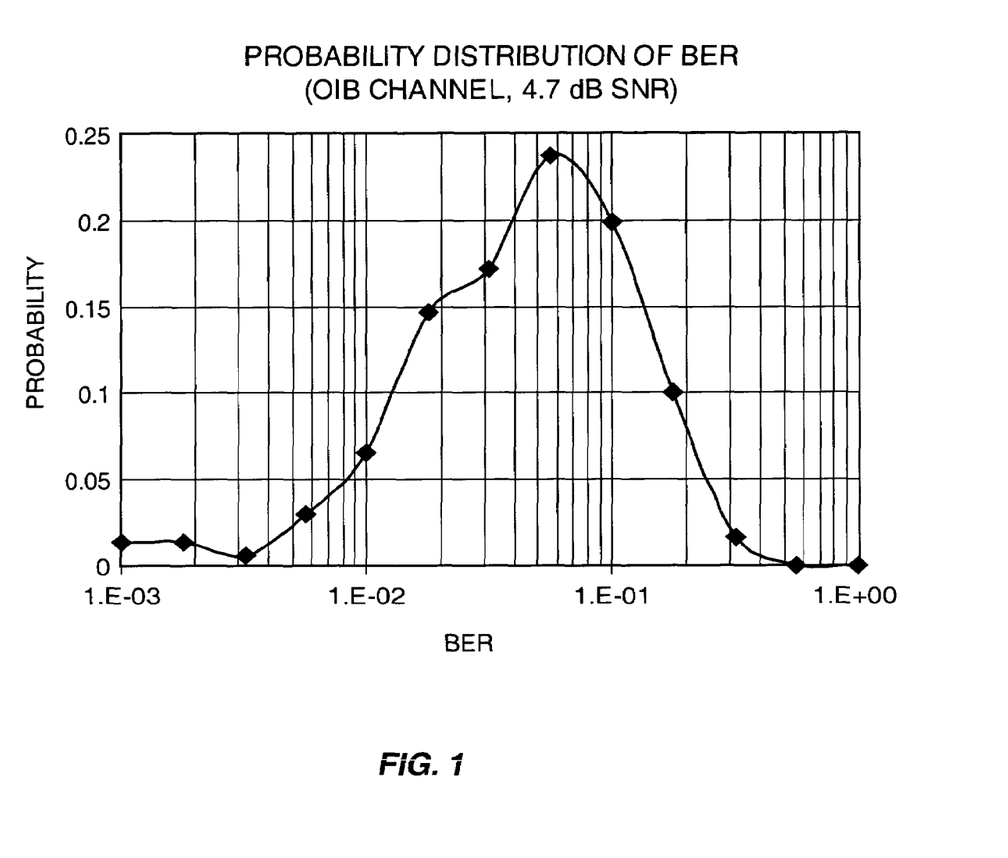
FIG. 1 illustrates the variation in bit error rates for a given carrier-to-interference ratio.

In orthogonal frequency division multiplexing (OFDM) systems, the CIR may also be used as a CQI in the same fashion as it is used for CDMA. When one plots the average error rate at the mobile terminal as a function of the CIR, the result is a monotonically decreasing function. However, OFDM and CDMA communications differ in some fundamental ways. One particular difference is the mechanism by which frequency diversity is achieved in each system. Due to this difference, CIR alone is not the most reliable indication of the error rate to be expected at the mobile terminal. As illustrated in FIG. 1, for a given CIR, there is a fairly large variance in the error rate. A large variance in the error rate for a given CIR implies that there are other factors that influence the error rate, not just the CIR. In contrast, CDMA systems have a much smaller variance in the error rate at a particular CIR at the output of a receiver, and as such, the CIR alone has proven to be a good CQI. Since CIR alone is not sufficient for efficient OFDM systems, there is a need for an improved CQI for OFDM systems that takes into account the frequency response of the channel.

SUMMARY OF THE INVENTION

The present invention provides an improved channel quality indicator indicia for OFDM communication environments. In addition to taking into consideration carrier-to-interference ratios, the present invention also takes into consideration the degree to which the channel response varies among the sub-carriers throughout the OFDM frequency band. The carrier-to-interference ratio and the degree of channel response variation are directly or indirectly used by a base station to select coding and modulation schemes for transmissions from the base station to the mobile terminal reporting these factors. Further, scheduling of data sent to the mobile terminal and other mobile terminals competing for the same channel resources may also be based in part on the carrier-to-interference ratio and the degree to which the channel response varies.

The variation of the channel gain throughout the OFDM frequency band may be calculated by determining the standard deviation of the channel gain throughout the sub-carriers of the OFDM frequency band. Preferably, standard deviation is calculated using the logarithm of the various channel gains. The sub-carriers for which the variation is considered are preferably those sub-carriers used for data transmission, wherein those sub-carriers on the outside boundaries of the OFDM frequency band used for interference buffering are not considered.

The carrier-to-interference ratio and the degree to which the sub-carriers vary are generally measured at the mobile terminal and may be sent to the base station in any number of formats. Measures of each of these indicia may be sent to the base station, which will take the two factors and determine a channel quality indicator. Alternatively, the mobile terminal can arrive at a channel quality indicator value, which is sent to the base station and is then used to select coding and modulation, as well as to assist in scheduling data for transmission. Those skilled in the art will recognize various ways for providing such channel quality indicator indicia from the mobile terminal to the base station.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention adaptively controls coding and modulation techniques for transmission as well as multi-user scheduling based on an improved channel quality indicator (CQI) in an orthogonal frequency division multiplexing (OFDM) environment. The channel quality indicator is determined based on a carrier to interference ratio (CIR) and a measure of the degree to which the channel response varies across the band of sub-carriers for the OFDM frequency band. The latter measure is referred to as a variation measure for simplicity and ease of understanding. In one embodiment, the channel gains for each of the sub-carriers used for transmission are used to determine the variation measure. For example, the variation measure may be the standard deviation of the logarithm of the channel gains. The measurements required to determine the CIR and variation measure are measured at a mobile terminal; however, the CQI may be determined at the mobile terminal or at a serving base station depending on the desired implementation of the invention. The following description initiates with an overview of a wireless communication environment and the architecture of a base station, or like access point, and a mobile terminal.

Figure 2:
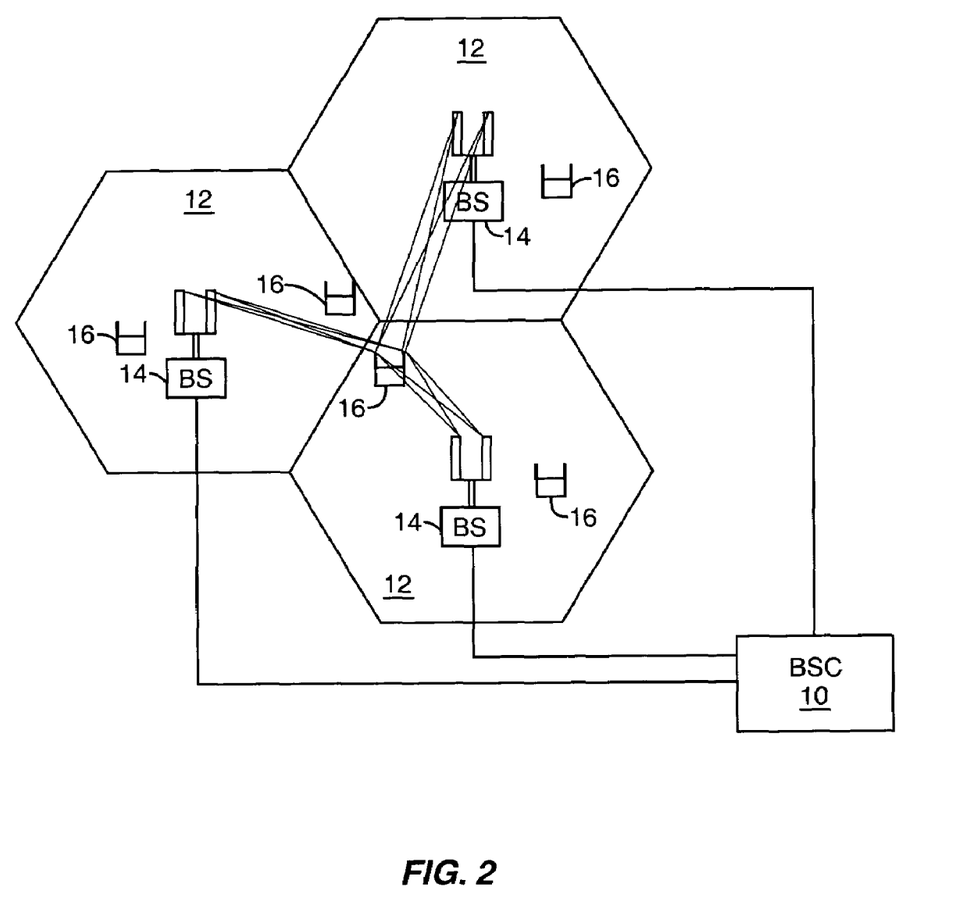
FIG. 2 is a block representation of a cellular communication system.

With reference to FIG. 2, a base station controller (BSC) 10 controls wireless communications within multiple cells 12, which are served by corresponding base stations (BS) 14. In general, each base station 14 facilitates communications using OFDM with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 3:
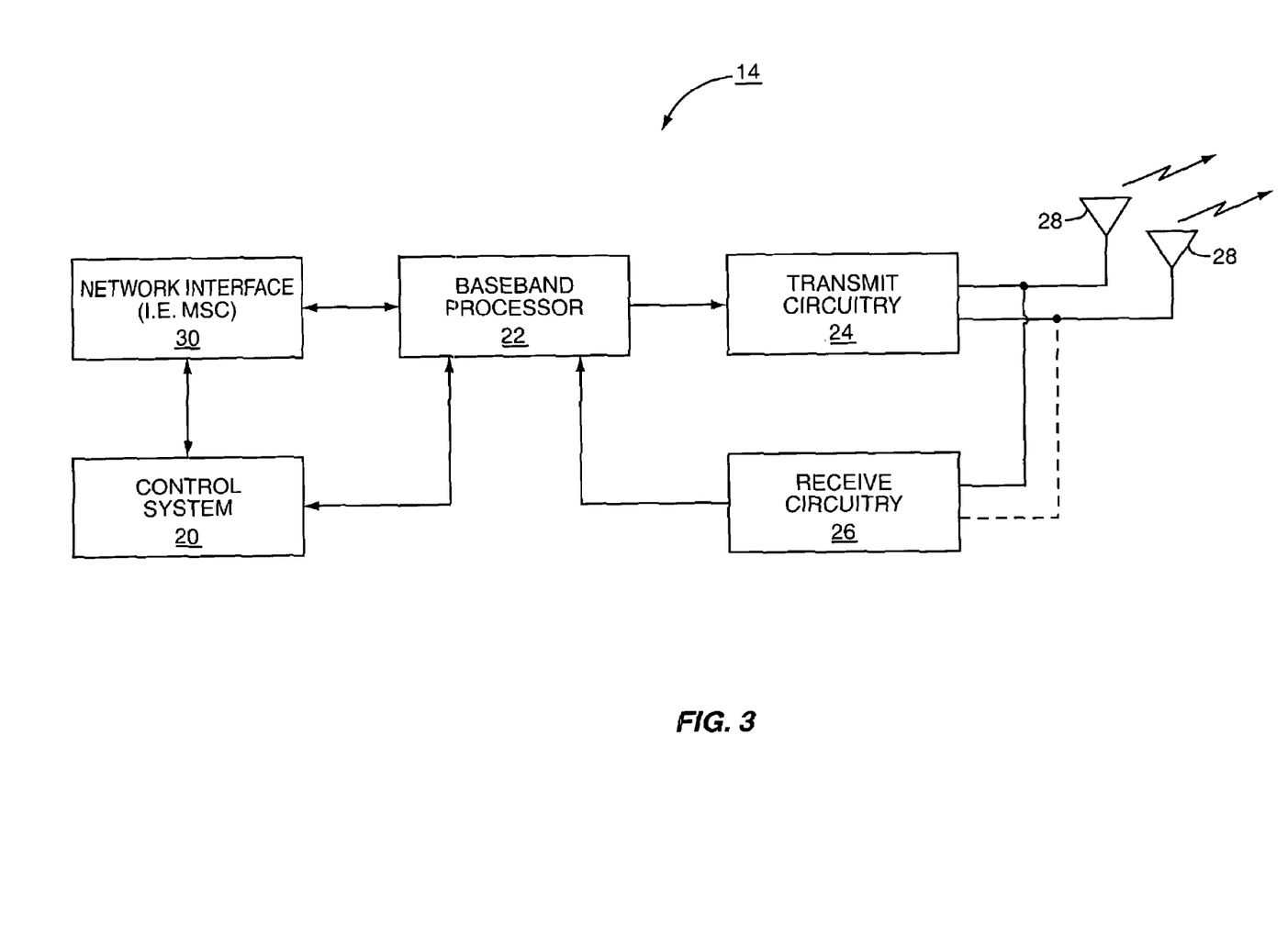
FIG. 3 is a block representation of a base station according to one embodiment of the present invention.

A high level overview of the mobile terminals 16 and base stations 14 of the present invention is provided prior to delving into the structural and functional details of the preferred embodiments. With reference to FIG. 3, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 4). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

Figure 4:
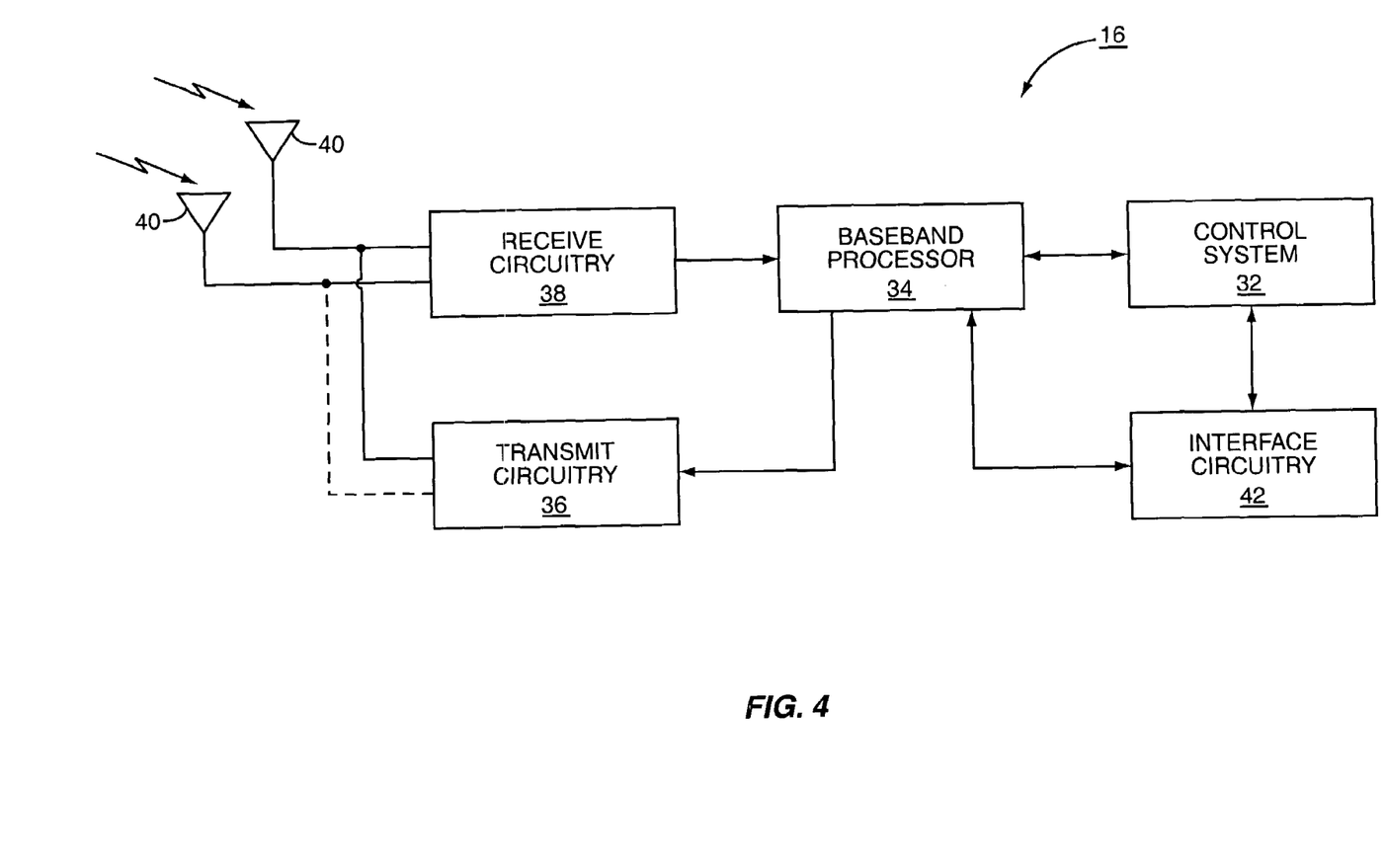
FIG. 4 is a block representation of a mobile terminal according to one embodiment of the present invention.

With reference to FIG. 4, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation decoding and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation requires the performance of an Inverse Fast Fourier Transform (IFFT) on the information to be transmitted. For demodulation, the performance of a Fast Fourier Transform (FFT) on the received signal is required to recover the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In the preferred embodiment, OFDM is used for at least the downlink transmission from the base stations 14 to the mobile terminals 16. Each base station 14 is equipped with n transmit antennas 28, and each mobile terminal 16 is equipped with m receive antennas 40. Notably, the respective antennas can be used for reception and transmission using appropriate duplexers or switches and are so labeled only for clarity.

Figure 5:
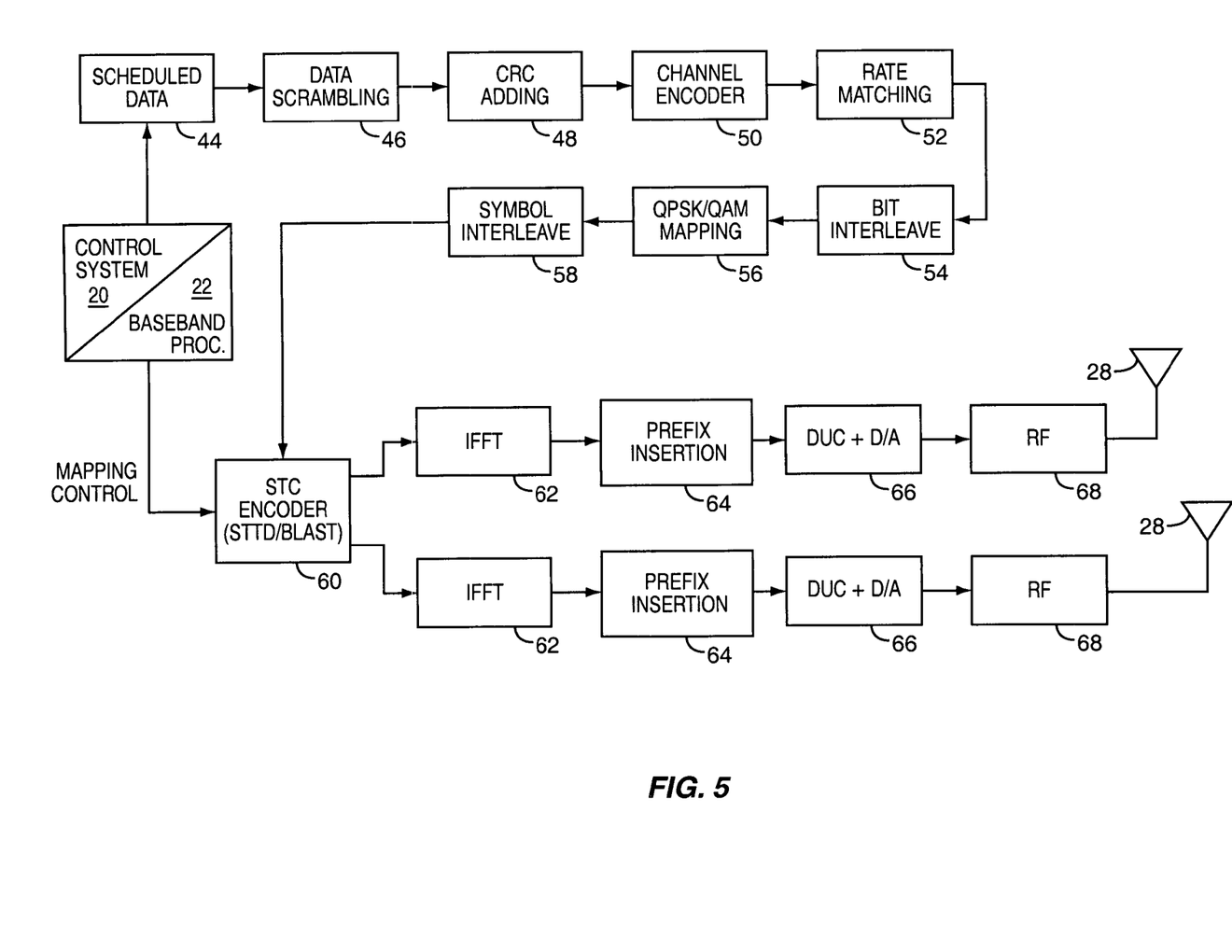
FIG. 5 is a logical breakdown of an OFDM transmitter architecture according to one embodiment of the present invention.

With reference to FIG. 5, a logical OFDM transmission architecture is provided according to one embodiment. Initially, the base station controller 10 will send data to be transmitted to various mobile terminals 16 to the base station 14. The base station 14 may use the CQIs associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide n outputs corresponding to the number of transmit antennas 28 for the base station 14. The control system 20 and/or baseband processor 22 will provide a mapping control signal to control STC encoding. At this point, assume the symbols for the n outputs are representative of the data to be transmitted and capable of being recovered by the mobile terminal 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
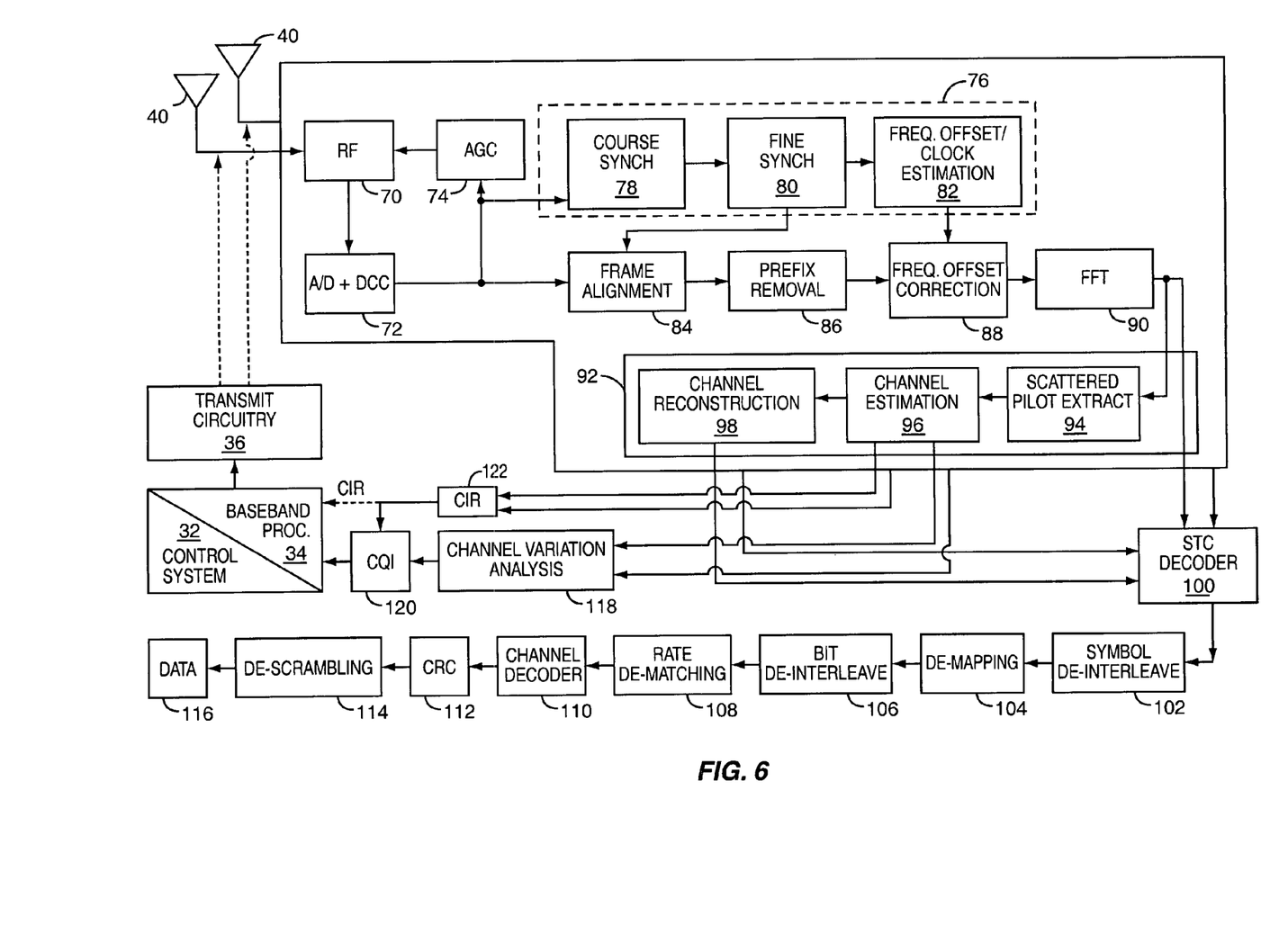
FIG. 6 is a logical breakdown of an OFDM receiver architecture according to one embodiment of the present invention.

Reference is now made to FIG. 6 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

Figure 7:
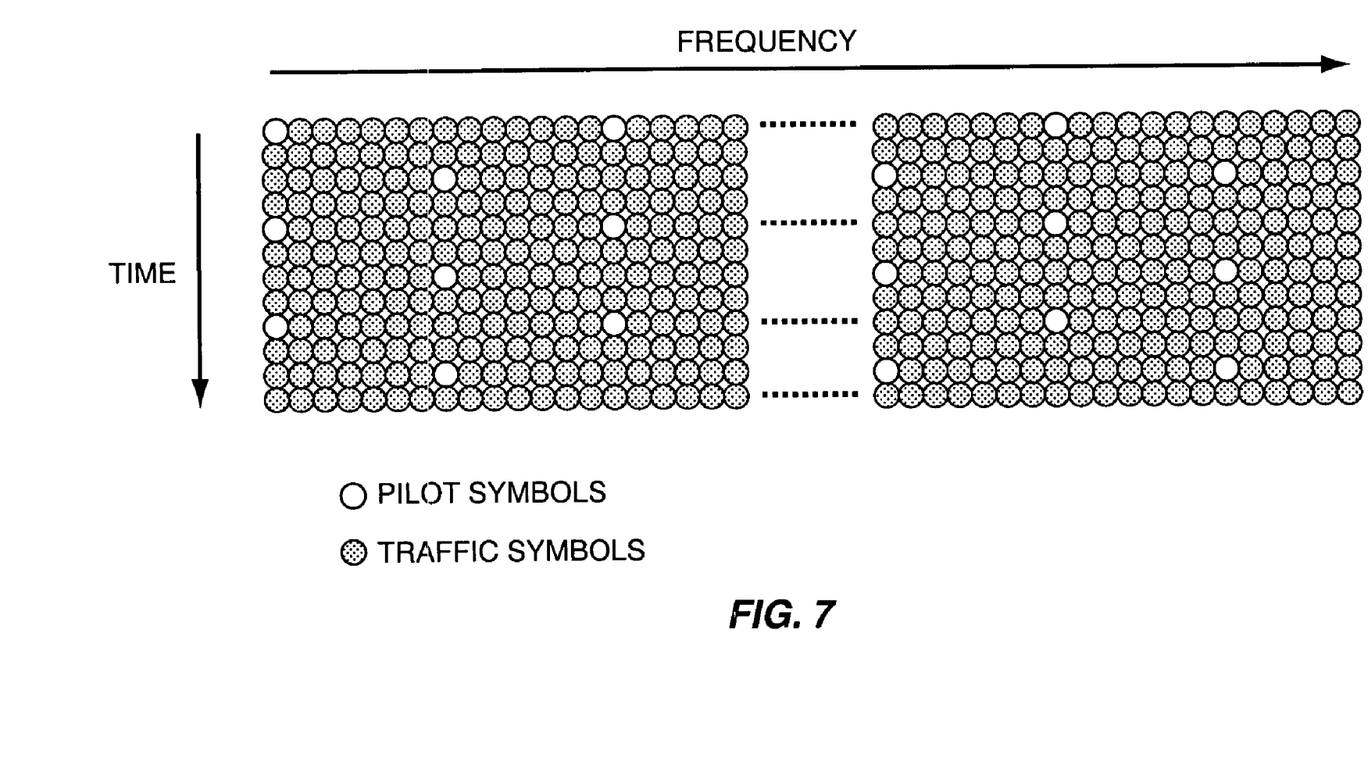
FIG. 7 illustrates a pattern of sub-carriers for carrying pilot symbols in an OFDM environment.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. FIG. 7 illustrates an exemplary scattering of pilot symbols among available sub-carriers over a given time and frequency plot in an OFDM environment. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI in a preferred embodiment is a function of the carrier-to-interference ratio (CIR), as well as the degree to which the channel response varies across the various sub-carriers in the OFDM frequency band. For this embodiment, the channel gain for each sub-carrier in the OFDM frequency band being used to transmit information are compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Continuing with FIG. 6, a relative variation measure may be determined by providing the channel response information from the channel estimation function 96 to a channel variation analysis function 118, which will determine the variation and channel response for each of the sub-carriers in the OFDM frequency band, and if standard deviation is used, calculate the standard deviation associated with the frequency response. As noted, channel gain is a preferred measure of the channel response for calculating a CQI. The channel gain may be quantified based on a relative amplitude of the channel frequency response in decibels (dB), and as such, the amplitude of the channel frequency response may be represented by $H_{dB}(k)$, which is a function of a sub-carrier index k, where $k = 1 \ldots k_{MIN}, \ldots k_{MAX}, \ldots k_{FFT}$. Notably, $k_{FFT}$ is the number of sub-carriers in the entire OFDM frequency band, and the sub-carriers $k_{MIN}$ through $k_{MAX}$ represent the sub-carriers within the OFDM frequency band that are actually used to transmit data. Typically, a range of sub-carriers at either end of the range of sub-carriers are not used, in order to minimize interference with other transmissions. As such the degree of variation of the amplitude of the channel response may be determined only for the range of sub-carriers being used to transmit data ($k_{MIN}$ through $k_{MAX}$). The standard deviation of the channel response across the usable range of sub-carriers is calculated as follows:

$$std = \sqrt{\frac{1}{N_u - 1} \sum_{k_{MIN}}^{k_{MAX}} (H_{dB}(k) - \overline{H}_{dB})^2}, \quad \text{Eq. 1}$$

where $N_u$ is the number of usable sub-carriers, $H_{dB}(k)$ is the log amplitude of the channel frequency response, and $\overline{H}_{db}$ is the mean of the log amplitude of the channel response across the usable range of sub-carriers or a subset thereof.

In a multiple-input multiple-output (MIMO) system where there are multiple transmit and multiple receive antennas 28, 40 each link corresponding to transmit/receive antenna pairs will have a unique CQI. An aggregate CQI, or set of aggregate CQIs, may be required for the overall MIMO set of links. To determine the aggregate CQIs, the channel frequency response and CIR for each transmit and receive antenna pair is determined.

For multiple receive antennas 40, the multiple channel frequency responses are combined, to provide for the diversity achieved from the multiple receive antennas 40. This combining is an averaging of the power of the respective channel frequency responses across the OFDM frequency band. The channel variation measure is then determined across the combined channel frequency response. The CIR values for the respective multiple receive antennas 40 are combined by summing.

For multiple transmit antennas 28, the modification to the CQI will depend on the particular space time coding technique employed to reflect the method by which the transmit diversity is being achieved by the code and used by the system. Some schemes, such as transmit diversity, will require that the respective channel frequency responses from the multiple transmit antennas 28 be combined as described for the multiple receive antennas 40 by averaging the power of the channel frequency responses across the OFDM frequency band. The channel variation measure is made across the combined frequency response. Further, the CIR values for the multiple transmit antennas 28 are also combined. For other schemes, a separate CQI may be determined for each transmit antenna 28 and relayed back to the base station 14. The base station 14 may use the CQI per transmit antenna 28 to separately adapt the modulation and coding on the data transmitted on the respective transmit antennas 28.

Figure 8:
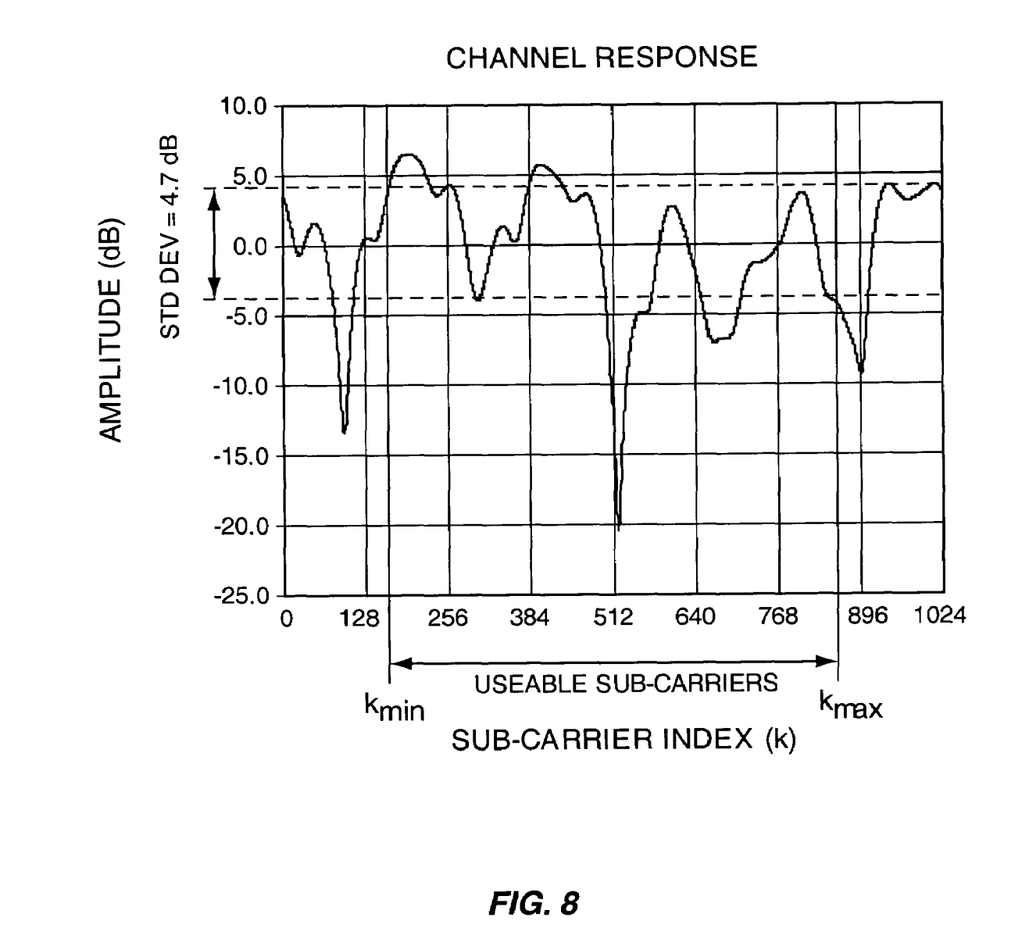
FIG. 8 illustrates an example channel frequency response and a standard deviation associated therewith.

With reference to FIG. 8, an example channel frequency response is illustrated, wherein channel gain is represented by the log amplitude of the channel gain across the k sub-carriers for the entire OFDM frequency range. In this case, the entire OFDM frequency range has 1,024 sub-carriers, and the standard deviation for the given example is 4.7 dB. Again, although standard deviation is illustrated as a technique for determining the degree of variation throughout the range of usable sub-carriers, those skilled in the art will recognize numerous techniques for determining the relative variation thereof.

Continuing with FIG. 6, once the channel variation analysis is provided, a variation measure is provided to a CQI function 120 or to the baseband processor 34 for transmission back to the base station 14 via the transmit circuitry 36, depending on the configuration of the embodiment. If the CQI is determined at the base station 14, then the mobile terminal 16 will provide information indicative of the CIR as well as the variation analysis to the base station 14, which will calculate a CQI and control scheduling as well as coding and modulation for subsequent transmissions to the mobile terminal 16. If the CQI is generated at the mobile terminal 16 and transmitted to the base station 14, the CQI function 120 will receive a CIR from a CIR function 122 and will use the CIR and the variation measurement to either calculate or look up through a look-up table an appropriate CQI, which is then transmitted to the base station 14 via the transmit circuitry 36.

The CIR function 122 will preferably receive channel response information from the channel estimation function 96 and determine the CIR based on the relative strengths of the desired carrier in light of other interferers in traditional fashion When the pilot symbols are passed through the channel estimation function 96, the pilot symbols are filtered in a manner exploiting the known pilot symbols to remove noise and interference. The output of the channel estimation function 96 is intended to be a noiseless replica of the pilot symbol. With this replica, the carrier power may be determined, as well as subtracted from the received pilot symbol to yield a noise plus interference signal. This resulting signal is computed to provide an interference power, which is compared to the carrier power to determine the CIR. One example of determining a CIR is provided in co-assigned U.S. patent application Ser. No. 10/038,916 filed Jan. 8, 2002. Those skilled in the art will recognize numerous techniques for determining the CIR. Importantly, the CQI, whether calculated at the mobile terminal 16 or at the base station 14, is based on the variation measure indicia, preferably in light of a CIR. Since the CIR for an OFDM system fails to account for the respective responses for each of the sub-carriers used for transmission, providing a CQI based on the CIR and the variation measure indicia significantly improves the performance of the OFDM system by allowing the base station 14 to better predict an appropriate coding and modulation technique, as well as to provide scheduling among the multiple users.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   a) receiving from a mobile terminal an indicator of a degree to which a channel response varies across sub-carriers over an orthogonal frequency division multiplexing frequency band;
   b) receiving from the mobile terminal an indicator of a carrier-to-interference ratio associated with the mobile terminal;
   c) determining a channel quality indicator based on both the indicator of the degree to which the channel response varies and the indicator of the carrier-to-interference ratio; and
   d) controlling transmission of information to the mobile terminal based on the channel quality indicator.

2. The method of claim 1 wherein the channel quality indicator is a value determined at the mobile terminal, the value being a function of the degree to which the channel response varies across the sub-carriers over the orthogonal frequency division multiplexing frequency band and the carrier-to-interference ratio.

3. The method of claim 1 wherein the channel quality indicator includes first information representing the degree to which the channel response varies across the sub-carriers over the orthogonal frequency division multiplexing frequency band and second information pertaining to the carrier-to-interference ratio, the method further comprising calculating a channel quality indicator value based on the first and second information such that transmission of information to the mobile terminal is a function of the channel quality indicator value.

4. The method of claim 1 wherein controlling transmission of information further comprises selecting a coding and modulation scheme for transmission of information to the mobile terminal and transmitting the information to the mobile terminal using the coding and modulation scheme.

5. The method of claim 4 wherein controlling transmission of information further comprises scheduling the transmission of information to the mobile terminal based on the channel quality indicator.

6. The method of claim 1 wherein controlling transmission of information further comprises scheduling the transmission of information to the mobile terminal based on the channel quality indicator.

7. The method of claim 1 wherein the channel response is a measure of channel gains for a plurality of the sub-carriers.

8. The method of claim 7 wherein the channel quality indicator bears on a standard deviation of the channel gains for the plurality of sub-carriers.

9. The method of claim 8 wherein the channel quality indicator bears on a standard deviation of a logarithm of the channel gains for the plurality of sub-carriers.

10. The method of claim 1 wherein the degree to which the channel response varies across sub-carriers over the orthogonal frequency division multiplexing frequency band is determined for a limited range of the sub-carriers within the orthogonal frequency division multiplexing band.

11. The method of claim 10 wherein the limited range of sub-carriers is a range of sub-carriers only used for the transmission of information.

12. The method of claim 1 wherein the indicator of the degree to which the channel response varies and the indicator of the carrier-to-interference ratio are received for multiple transmit and receive antennas.

13. The method of claim 12 wherein the indicators received for the multiple transmit and receive antennas are combined to determine an aggregate channel quality indicator to be used for controlling transmission of information to the mobile terminal.

14. The method of claim 13 wherein the indicators of the degree to which the channel response varies are combined by averaging the power of the channel frequency response across the orthogonal frequency division multiplexing frequency band and the indicators of the carrier-to-interference ratio are combined by summing.

15. A method comprising:
a) monitoring channel conditions associated with a transmission received from a base station;
b) determining a carrier-to-interference ratio associated with the transmission received from the base station;
c) determining a channel quality indicator based on the channel conditions, the channel quality indicator bearing both on a degree to which a channel response varies across sub-carriers over an orthogonal frequency division multiplexing frequency band and on the carrier-to-interference ratio; and
d) transmitting the channel quality indicator to the base station for controlling transmission of information from the base station.

16. The method of claim 15 wherein the channel quality indicator is a value, which is a function of the degree to which the channel response varies across sub-carriers over an orthogonal frequency division multiplexing frequency band and the carrier-to-interference ratio.

17. The method of claim 15 wherein the channel quality indicator includes first information representing the degree to which the channel response varies across the sub-carriers over the orthogonal frequency division multiplexing frequency band and second information pertaining to the carrier to interference ratio, such that the base station calculates a channel quality indicator value based on the first and second information and the transmission of information from the base station is a function of the channel quality indicator value.

18. The method of claim 15 wherein the channel quality indicator dictates a coding and modulation scheme for the transmission of information from the base station.

19. The method of claim 18 wherein the channel quality indicator is further used by the base station to schedule the transmission of information from the base station.

20. The method of claim 15 wherein the channel quality indicator is used by the base station to schedule the transmission of information from the base station.

21. The method of claim 15 wherein the channel response is a measure of channel gains for a plurality of the sub-carriers.

22. The method of claim 21 wherein the channel quality indicator bears on a standard deviation of the channel gains for the plurality of sub-carriers.

23. The method of claim 22 wherein the channel quality indicator bears on a standard deviation of a logarithm of the channel gains for the plurality of sub-carriers.

24. The method of claim 15 wherein the degree to which the channel response varies across the sub-carriers over the orthogonal frequency division multiplexing frequency band is determined for a limited range of the sub-carriers within the orthogonal frequency division multiplexing band.

25. The method of claim 24 wherein the limited range of sub-carriers is a range of sub-carriers only used for the transmission of information.

26. A system comprising:
a) receive circuitry adapted to receive from a mobile terminal a channel quality indicator bearing both on a degree to which a channel response varies across sub-carriers over an orthogonal frequency division multiplexing frequency band and on a carrier-to-interference ratio associated with the mobile terminal; and
b) control circuitry associated with the receive circuitry and adapted to control transmission of information to the mobile terminal based on the channel quality indicator.

27. The system of claim 26 wherein the channel quality indicator is a value determined at the mobile terminal, the value being a function of the degree to which the channel response varies across the sub-carriers over the orthogonal frequency division multiplexing frequency band and the carrier to interference ratio.

28. The system of claim 26 wherein the channel quality indicator includes first information representing the degree to which the channel response varies across the sub-carriers over the orthogonal frequency division multiplexing frequency band and second information pertaining to the carrier-to-interference ratio, the system further comprising calculating a channel quality indicator value based on the first and second information such that transmission of information to the mobile terminal is a function of the channel quality indicator value.

29. The system of claim 26 wherein to control transmission of information the control system is further adapted to select a coding and modulation scheme for transmission of information to the mobile terminal and further comprising transmission circuit adapted to transmit the information to the mobile terminal using the coding and modulation scheme.

30. The system of claim 29 wherein to control transmission of information the control system is further adapted to schedule the transmission of information to the mobile terminal based on the channel quality indicator.

31. The system of claim 26 wherein to control transmission of information the control system is further adapted to schedule the transmission of information to the mobile terminal based on the channel quality indicator.

32. The system of claim 26 wherein the channel response is a measure of channel gains for a plurality of the sub-carriers.

33. The system of claim 32 wherein the channel quality indicator bears on a standard deviation of the channel gains for the plurality of sub-carriers.

34. The system of claim 33 wherein the channel quality indicator bears on a standard deviation of a logarithm of the channel gains for the plurality of sub-carriers.

35. The system of claim 26 wherein the degree to which the channel response varies across the sub-carriers over the orthogonal frequency division multiplexing frequency band is determined for a limited range of sub-carriers within the orthogonal frequency division multiplexing band.

36. The system of claim 35 wherein the limited range of sub-carriers is a range of sub-carriers only used for the transmission of information.

37. A system comprising:
   a) receive circuitry adapted to monitor channel conditions associated with a transmission received from a base station;
   b) a control system associated with the receive circuitry and adapted to:
      i) determine a carrier-to-interference ratio associated with the transmissions received from the base station; and
      ii) determine a channel quality indicator based on the channel conditions, the channel quality indicator bearing both on a degree to which a channel response varies across sub-carriers over an orthogonal frequency division multiplexing frequency band and on the carrier-to-interference ratio; and
   c) transmission circuitry associated with the control system and adapted to transmit the channel quality indicator to the base station for controlling transmission of information from the base station.

38. The system of claim 37 wherein the channel quality indicator is a value, which is a function of the degree to which the channel response varies across the sub-carriers over the orthogonal frequency division multiplexing frequency band and the carrier-to-interference ratio.

39. The system of claim 37 wherein the channel quality indicator includes first information representing the degree to which the channel response varies across the sub-carriers over the orthogonal frequency division multiplexing frequency band and second information pertaining to the carrier-to-interference ratio, such that the base station calculates a channel quality indicator value based on the first and second information and the transmission of information from the base station is a function of the channel quality indicator value.

40. The system of claim 37 wherein the channel quality indicator dictates a coding and modulation scheme for the transmission of information from the base station.

41. The system of claim 40 wherein the channel quality indicator is further used by the base station to schedule the transmission of information from the base station.

42. The system of claim 37 wherein the channel quality indicator is used by the base station to schedule the transmission of information from the base station.

43. The system of claim 37 wherein the channel response is a measure of channel gains for a plurality of the sub-carriers.

44. The system of claim 43 wherein the channel quality indicator bears on a standard deviation of the channel gains for the plurality of sub-carriers.

45. The system of claim 44 wherein the channel quality indicator bears on a standard deviation of a logarithm of the channel gains for the plurality of sub-carriers.

46. The system of claim 37 wherein the degree to which the channel response varies across the sub-carriers over the orthogonal frequency division multiplexing frequency band is determined for a limited range of sub-carriers within the orthogonal frequency division multiplexing band.

47. The system of claim 46 wherein the limited range of sub-carriers is a range of sub-carriers only used for the transmission of information.

\* \* \* \* \*